(12) United States Patent
Noh

(10) Patent No.: US 8,072,428 B2
(45) Date of Patent: Dec. 6, 2011

(54) APPARATUS AND METHOD FOR INPUTTING CHARACTERS IN PORTABLE TERMINAL

(75) Inventor: Kwang-Seok Noh, Uijeongbu-si (KR)

(73) Assignee: Samsung Electronics Co., Ltd (KR)

( * ) Notice: Subject to any disclaimer, the term of this patent is extended or adjusted under 35 U.S.C. 154(b) by 1083 days.

(21) Appl. No.: 11/874,587

(22) Filed: Oct. 18, 2007

(65) Prior Publication Data

US 2008/0117179 A1    May 22, 2008

(30) Foreign Application Priority Data

Nov. 17, 2006    (KR) .......................... 10-2006-0113615

(51) Int. Cl.
*G09G 5/00* (2006.01)

(52) U.S. Cl. ........................................ 345/169; 345/173

(58) Field of Classification Search .................. 345/156, 345/157, 169, 173–175, 104; 178/18.01–18.07, 178/19.01–19.05
See application file for complete search history.

(56) References Cited

U.S. PATENT DOCUMENTS

| | | | | |
|---|---|---|---|---|
| 5,995,026 A * | 11/1999 | Sellers | ............................ | 341/34 |
| 7,277,029 B2 * | 10/2007 | Thiesson et al. | ................ | 341/22 |
| 7,712,053 B2 * | 5/2010 | Bradford et al. | .............. | 715/864 |
| 2006/0125785 A1 * | 6/2006 | McAlindon | .................... | 345/156 |
| 2007/0135104 A1 * | 6/2007 | Suzuki et al. | .............. | 455/414.1 |
| 2008/0015115 A1 * | 1/2008 | Guyot-Sionnest et al. | ..... | 506/24 |
| 2008/0174553 A1 * | 7/2008 | Trust | ............................ | 345/163 |
| 2009/0179780 A1 * | 7/2009 | Tambe | ............................ | 341/23 |

FOREIGN PATENT DOCUMENTS

| | | |
|---|---|---|
| KR | 20-0318600 | 6/2003 |
| KR | 1020040028027 | 4/2004 |

* cited by examiner

*Primary Examiner* — Ricardo L Osorio
(74) *Attorney, Agent, or Firm* — The Farrell Law Firm, P.C.

(57) ABSTRACT

A method and apparatus for inputting characters in a portable terminal. The method includes displaying on a display unit an arrangement of characters corresponding to a character input mode from among a plurality of arrangements of characters according to various modes, the characters being respectively mapped to combinations of two keys mode; and displaying a character corresponding to the character input mode from among the characters according to the various modes when one of the combinations of two keys is touched.

18 Claims, 4 Drawing Sheets

APPARATUS AND METHOD FOR INPUTTING CHARACTERS IN PORTABLE TERMINAL

PRIORITY

This application claims priority under 35 U.S.C. §119 to an application filed in the Korean Intellectual Property Office on Nov. 17, 2006 and assigned Serial No. 2006-0113615, the contents of which are incorporated herein by reference.

BACKGROUND OF THE INVENTION

1. Field of the Invention

The present invention generally relates to an apparatus and method for inputting characters in a portable terminal, and in particular, to an apparatus and method for inputting characters in a portable terminal using a bar-type touch pad.

2. Description of the Related Art

As portable terminals are becoming smaller, lighter, and thinner, their use has risen sharply, in part, because they are very handy to carry. Accordingly, service providers (terminal manufacturers) have been developing terminals with more convenient functions in order satisfy user demands and to secure as many users as possible.

Among various portable terminal functions, users have been preferring additional functions related to messages, such as short messages, multimedia messages, e-mail, broadcast messages, etc., over calling functions. Thus, as the number of character inputs has increased, various methods of efficiently inputting characters have been introduced accordingly.

For example, the CheonJiIn input mode has been conventionally used, as shown in FIG. 1 (CheonJiIn is a Korean word that means heaven, earth, and human). In the CheonJiIn input mode, vowels are categorized into three elements: heaven (•) 103, earth (—) 105, and human (ㅣ) 101. Then, the heaven (•) 103, the earth (—) 105, and the human (ㅣ) 101 are respectively allocated to three keys, and two consonants are allocated to each of the other keys. According to the CheonJiIn input mode, all the vowels can be expressed using combinations of the keys being respectively allocated the above three elements, i.e., the heaven (•) 103, the earth (—) 105, and the human (ㅣ) 101; and all the consonants can be expressed while changing the number of times that each key being allocated two consonants is input.

However, the CheonJiIn character input mode is disadvantageous in that a user must wait for a certain length of time or input a navigation key or a key allocated to a blank character in order to continuously input characters allocated to the same key. Also, since several characters are allocated to one key, the associated key must be continuously pressed three times in order to input a single character.

In the meantime, as portable terminals are becoming smaller and smaller, various methods of minimizing the size of a keypad that normally occupies a considerable space in a portable terminal have been developed and introduced. For example, a touch screen can be included in a portable terminal in order to perform a character input operation in place of a keypad.

However, since a touch screen employs an input mode similar to a keypad, a character adjacent to a desired character may easily and inadvertently be input instead of the desired character. Also, it is impossible to input characters without viewing a screen. Further, when a touch screen is used for a long time, the liquid crystal in the touch screen may likely become damaged.

SUMMARY OF THE INVENTION

The present invention substantially solves at least the above problems and/or disadvantages and provides at least the advantages below. Accordingly, an aspect of the present invention is to provide an apparatus and method for inputting characters in a portable terminal.

Another aspect of the present invention is to provide an apparatus and method for inputting characters in a portable terminal using a bar type touch screen in order to minimize the size of the portable terminal.

Another aspect of the present invention is to provide an apparatus and method for inputting characters in a portable terminal, which are capable of reducing the number of times that keys are input by using a bar type touch screen.

Another aspect of the present invention is to provide an apparatus and method for inputting characters in a portable terminal, using complete characters.

According to an aspect of the present invention, there is provided a method of inputting characters in a portable terminal, the method including displaying on a display unit an arrangement of characters corresponding to a character input mode, from among a plurality of arrangements of characters according to various modes, where the characters according to the various modes are respectively mapped to combinations of two keys; and when one of the combinations of two keys is touched, displaying a character corresponding to the character input mode from among the characters according to the various modes.

According to another aspect of the present invention, there is provided an apparatus for inputting characters in a portable terminal, the apparatus including first and second touch pads each being divided into three regions, where three keys are respectively allocated to the three regions of each of the first and second touch pads; a display unit that displays an arrangement of characters corresponding to a character input mode from among a plurality of arrangements of characters according to various modes, and displays a character received from a character input processor, where the characters according to the various modes are respectively mapped to combinations of two keys displayed on the first and second touch pads; and the character input processor that checks a character corresponding to the character input mode from among the characters according to the various modes, and outputs the character to the display unit, when one of the combinations of the two keys is touched, where the characters according to the various modes are respectively mapped to the combinations of two keys.

BRIEF DESCRIPTION OF THE DRAWINGS

The above and other objects, features and advantages of the present invention will become more apparent from the following detailed description when taken in conjunction with the accompanying drawings in which:

FIGS. 4A and 4B illustrate various arrangements of characters in a portable terminal using a bar type touch pad, according to the present invention.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides a method and apparatus for inputting characters in a portable terminal using combinations of two keys via two bar type touch pads, thereby reducing the number of times that keys are selected for character inputs.

Figure 2:
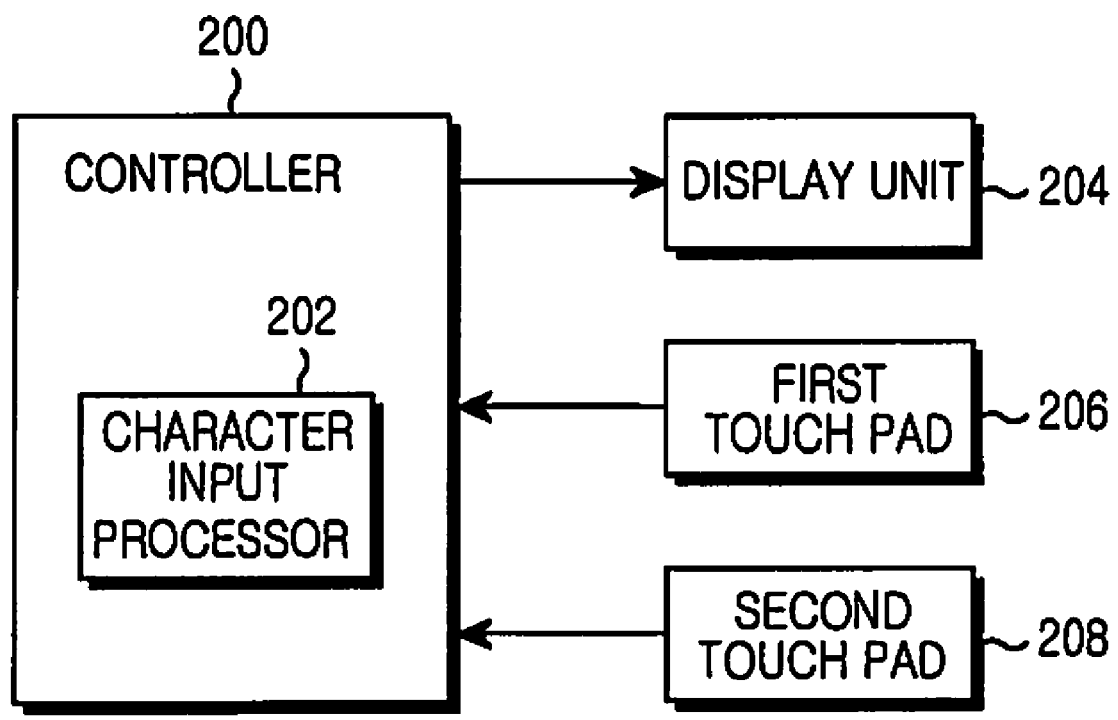
FIG. 2 is a block diagram of a portable terminal according to the present invention.

FIG. 2 shows a portable terminal according to the present invention. The portable terminal of FIG. 2 includes a controller 200, a character input processor 202, a display unit 204, a first touch pad 206, and a second touch pad 208.

In FIG. 2, the controller 200 controls the overall operation of the portable terminal, e.g., processing and controlling voice and data communications. In particular, according to the present invention, the controller 200 includes a character input processor 202 that controls and performs a function of receiving a character corresponding to a combination of keys input via the first and second touch pads 206 and 208.

Figures 4A, 4B:
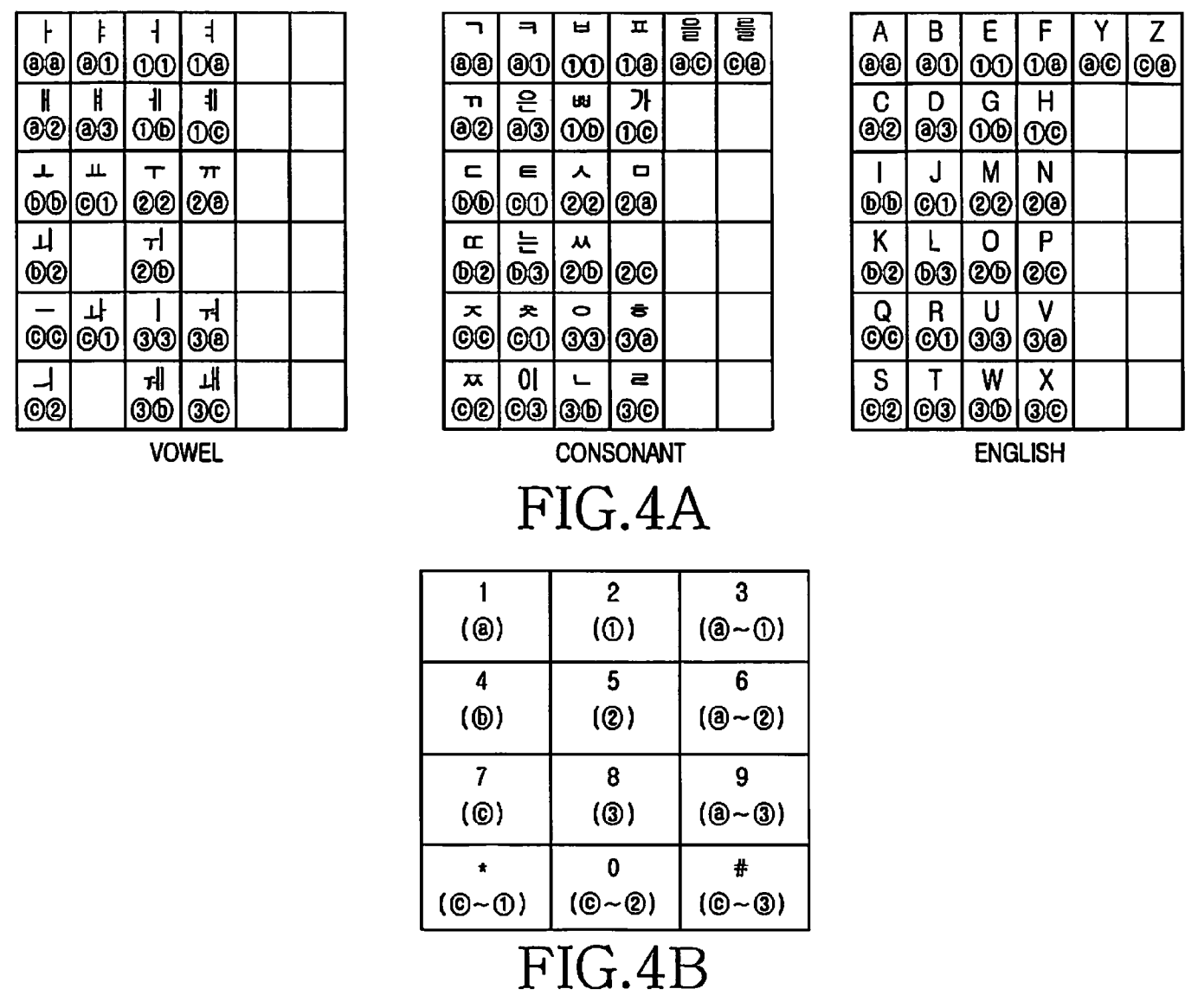

The character input processor 202 displays on the display unit 204 characters being respectively mapped to the combinations of keys input via the first and second touch pad 206 and 208, and checks a character corresponding to a combination of keys touched by a user and displays the character on the display unit 204. For example, the character input processor 202 is capable of arranging consonants, vowels, or English characters to respectively correspond to combinations of keys displayed on the first and second touch pads 206 and 208, as shown in FIG. 4A; and then displaying one of a constant mode, a vowel mode, and an English mode on the display unit 204. Each of the consonants, vowels, and English characters is mapped to a key or a combination of two keys so they can be input by touching only twice on the first and second touch pads 206 and 208.

Also, the character input processor 202 controls and performs a function of changing between character input modes or performing spacing according to a combination of keys touched by the user or locations of the first and second touch pads 206 and 208 where dragging is performed. For example, if a combination of keys for inputting a consonant is touched on the first and second touch pads 206 and 208, the character input processor 200 may display the consonant, and switch from a consonant mode to a vowel mode. A current character input mode can be changed by touching the first touch pad 206 and dragging thereon.

The display unit 204 displays state information, numbers, characters, and various images that are generated during the operation of the portable terminal. In particular, according to the present invention, the display unit 204 displays an arrangement of characters matching combinations of keys on the first and second touch pads 206 and 208, and a character corresponding to a combination of keys touched by the user.

The first and second touch pads 206 and 208 can provide a large number of function keys, similar to a general keypad, and simply recognize a touching operation of the user and provide the controller 200 with a touched location and motion information. In particular, according to the present invention, each of the first and second touch pads 206 and 208 is a thin bar type touch pads, and divided into three regions thus allowing three inputs to be received. For example, the first touch pad 206 may be divided into three regions being respectively allocated keys ⓐ, ⓑ, and ⓒ, and the second touch pad 208 may be divided into three regions being respectively allocated keys ①, ②, and ③. Also, the constructions of the first and second touch pads 206 and 208 may vary according to the type of the portable terminal.

Figure 3:
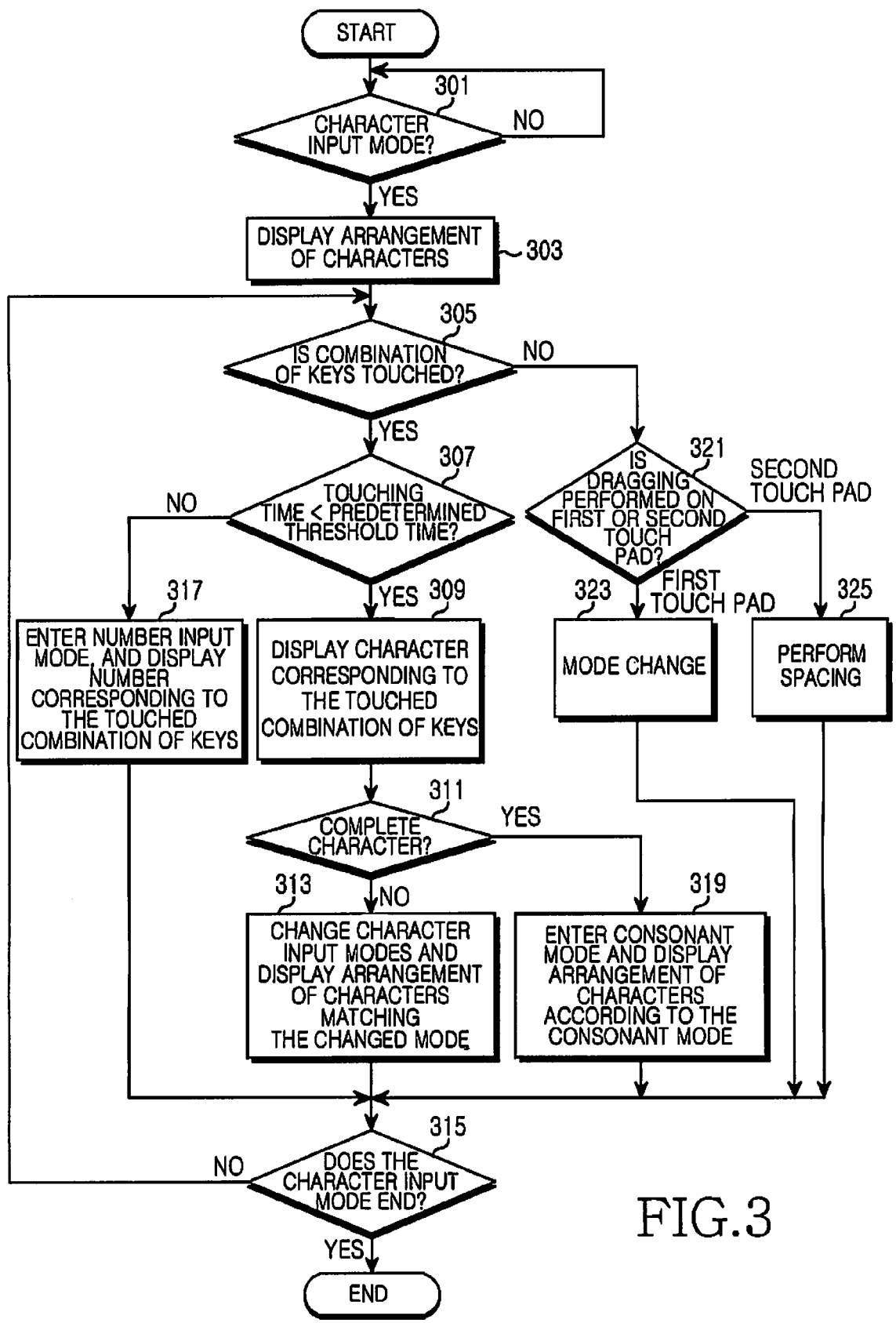
FIG. 3 is a flowchart illustrating a method of inputting characters in a portable terminal using a touch pad, according to the present invention.

FIG. 3 shows a method of inputting characters in a portable terminal using a touch pad, according to the present invention. The method of FIG. 3 will be described with respect to inputting Korean characters.

In FIG. 3, when a terminal enters a character input mode in step 301, the terminal displays an arrangement of characters according to a basic mode. For example, characters can be arranged to be mapped to combinations of keys on the first and second touch pads 206 and 208 of FIG. 2 in step 303. As shown in FIG. 4A, the terminal may display the arrangements of consonants, vowels, or English characters matching combinations of keys on the first and second touch pads 206 and 208. Each of the characters may be a key or a combination of two keys so they can be input by touching only twice on the first and second touch pads 206 and 208.

Next, the terminal determines whether a user selects, herein referred to as touches, a key or a combination of keys on the first and second touch pads 206 and 208 in step 305. When the key or the combination of the keys is touched, the terminal compares a length of time during which the key or the combination of the keys is touched with a threshold time in step 307. The touching of the combination of the keys may mean that two keys are touched at the same time or at different times.

The terminal switches from the character input mode to a number input mode when the length of time during which the key or the combination of the keys is touched, is equal to or greater than the threshold time (touching time≧threshold time), and displays a number corresponding to the touched key or combination of the keys in step 317. In this case, as shown in FIG. 4B, the terminal may display an arrangement of numbers each being mapped to a key or a combination of keys. For example, referring to FIG. 4B, the character input mode may switch to the number input mode and "5" mapped to the key ② may be input and displayed when numbers are mapped to the combinations of keys on the first and second touch pads 206 and 208 and the key ② is touched for a time longer than the threshold time. As shown in FIG. 4B, in order to input and display "0" mapped to a combination of two keys, the keys ⓒ and ② mapped to "0" are simultaneously touched for a time longer than the threshold time or one of the keys ⓒ and ② are touched while the other key is touched for a time longer than the threshold time. Thereafter, the terminal proceeds to step 315.

The terminal displays a character corresponding to the touched key or combination of the keys in step 309 when the length of time during which the key or the combination of the keys is less than the threshold time. For example, it is assumed that consonants, vowels, or English characters in FIG. 4 are mapped to the combinations of the keys on the first and second touch pads 206 and 208 and a current mode is a consonant mode. In this case, if the keys ⓐ and ① are respectively touched on the first and second touch pads 206 and 208, a consonant ㄱ is displayed, and if the keys ⓐ and ⓒ are touched on the first touch pad 206, a complete particle ⸝을⸵ is displayed.

Next, the terminal determines whether the character corresponding to the combination of the keys is a complete character in step 311. That is, the terminal determines whether the character is a complete character, such as 은,는,이,가,을,를, etc., which each include at least one consonant and at least one vowel. If the corresponding character is a complete character, the terminal maintains the consonant mode or switches from a current character input mode to the consonant mode, and displays the arrangement of characters according to the consonant mode on the display unit 204 in step 319. The terminal may perform the consonant mode after the complete character is input, so the user can input the consonant of a subsequent character. Next, the terminal proceeds to step 315.

However, if the character corresponding to the combination of the keys is not a complete character, the terminal proceeds to step 313, and changes the character input modes and displays the arrangement of characters matching the changed mode. In other words, if the current character input mode is the vowel mode, the vowel mode is changed to the consonant mode, and vice versa. Thereafter, the terminal proceeds to step 315.

If it is determined in step 305 that a key or a combination of keys are not touched, the terminal determines whether dragging is performed on the first touch pad 206 or the second touch pad 208 in step 321. The dragging means dragging on at least two regions of the three regions of each of the touch pads 206 and 208, rather than on a region of the three regions. For example, the dragging may be performed from the key ⓐ region to the key ⓑ region, or from the key ⓐ region to the key ⓑ region, and finally, to the key ⓒ region on the first touch pad 206. That is, the dragging does not mean dragging only in the key ⓐ region.

change is automatically performed after inputting a character. However, in the case of inputting English, sub modes, such as the consonant mode and the vowel input mod, are not used, and thus, the same English mode may be maintained even after inputting a character. If dragging is performed on a touch pad for a mode change, it is possible to switch between a capital letter mode and a small letter mode.

The above arrangement of characters displayed on the display unit 204 is just a virtual arrangement. Thus, the user can change the size of the arrangement of the characters displayed on the display unit 204, and determine not to display the arrangement on the display unit 204.

Keys that are to be touched (or input) and the number of times that they are touched in order to input characters, will be described with reference to FIGS. 2 through 4.

Figure 1:
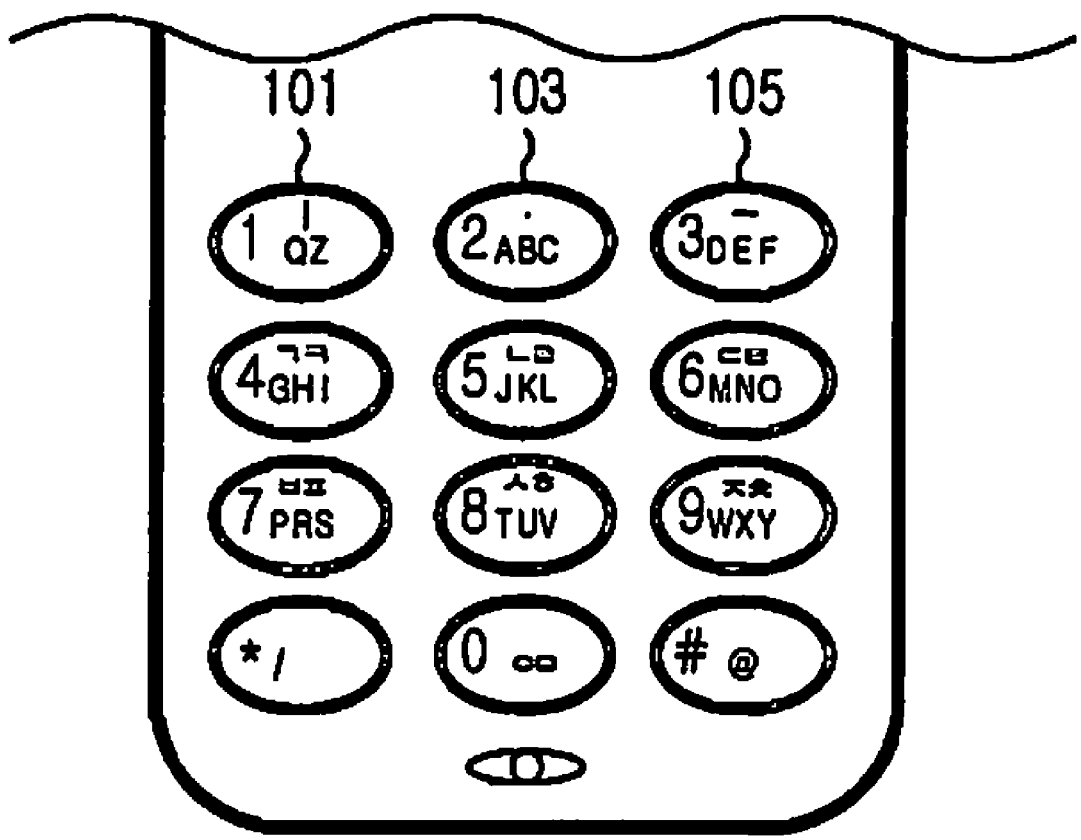
FIG. 1 is a conventional keypad for inputting characters.

Table 1 illustrates keys that are to be touched and the number of times that they are touched in order to input characters in both a portable terminal according to the present invention and a conventional portable terminal. A conventional method of inputting a character will be described with respect to the CheonJiIn input mode described above with reference to FIG. 1.

TABLE 1

| | Present Invention | Prior Art (CheonJiIn input mode) |
|---|---|---|
| "Roses of Sharon are bloom" | ②ⓐ②② ②ⓐⓐ②③③ ~ ③ⓐ ⓒ ①0032 4320 882312<br>ⓐ②ⓑⓑⓒ① ~ ⓒ③→ ①ⓐ③③<br>③③①①②ⓑ ~ ②ⓒⓒ①① ~<br>③ⓑ③③ ⓑⓑⓐⓐ<br>50 times (actually, 38 times since the same keys are continuously input 12 times) | 0032 4320 882312<br>4442399 01 → 771<br>021888 → 837 51612<br>42 times |
| access | ⓐⓐ ⓐ ⓐ② ①① ⓒ② ⓒ②<br>12 times (actually, 10 times since the same keys are continuously input twice) | 2 → 222 → 222 33 777 → 777<br>18 times |
| 010 1234 5678 | ⓒ ~ ②ⓐⓒ ~ ②ⓐ①ⓐ ~ ①ⓑ②<br>ⓐ ~ ②ⓒ①<br>15 times | 010 1234 5678<br>11 times |

If dragging is performed on the first touch pad 206, the terminal changes between character input modes in step 323. That is, if the character input mode is the consonant mode and dragging is performed on the first touch pad 206, then the terminal changes from the consonant mode to the vowel mode so a vowel can be input as a subsequent character. If the current character input and mode is the vowel mode and dragging is performed on the first touch pad 206, the terminal changes from the vowel mode to the consonant mode so a consonant can be input as a subsequent character. The user can input a consonant, such as 'ㅂㅅ', 'ㄹㄱ', 'ㄹㅈ', etc., by inputting a consonant and then inputting another consonant by dragging on the first touch pad 206. Then, the terminal proceeds to step 315.

If dragging is performed on the second touch pad 208, the terminal performs spacing and then perform the consonant mode in step 325. Then, the terminal proceeds to step 315. The consonant mode is set to be automatically performed after performing spacing, so the user can directly input the consonant of a subsequent character.

Next, the terminal determines whether the character input mode is to end in step 315. If it is determined that the character input mode is not to end, the terminal returns to step 305. If it is determined that the character input mode is to end, the process according to the present invention is completed.

The above method of FIG. 3 has been described above with respect to inputting Korean characters but can be applied to inputting English. When inputting Korean characters, the consonant mode and the vowel mode are used, and a mode Here, "~" denotes dragging on the first touch pad 206 in order to change character input modes, and "→" denotes that dragging on the second touch pad 208 to perform spacing and the consonant mode. Also, "~" denotes touching two keys at the same time.

Referring to Table 1, in order to input the expression, "Roses of Sharon are bloom", the present invention involves touching keys 50 times and the conventional method involves touching keys 42 times. That is, the number of times that keys are touched according to the present invention is greater than the number of times that keys are touched according to the conventional method. However, an operation of continuously touching the same key on a touch pad, according to the present invention, is easier than on a conventional key pad, and therefore, continuously inputting the same key may be considered as inputting the same key only once. Thus, the expression, "Roses of Sharon are bloom" may be input by inputting keys 38 times, excluding the number of times that the same keys are continuously input. Also, the complete particle «이» can be easily input using the keys ⓒ and ③. The number of times that keys are input in order to input "010 1234 5678", according to the present invention is greater than according to the conventional method. However, since two keys are touched at the same time, a time to complete key inputting is actually the same as when performing the conventional method.

As described above, according to the present invention, characters are input in a portable terminal using two bar-type touch pads. Thus, the size of the portable terminal can be reduced to be smaller than when using a conventional keypad, and the probability that an adjacent key is erroneously selected is lower than when using a conventional touch screen method. Since a character is input using only a combination of two keys via the two touch pads, every character can be input using a combination of two keys. Also, a large number of characters can be respectively mapped to combinations of two keys, and therefore, it is possible to easily input complete characters, such as a particle, which are frequently used by mapping them to keys. Also, the size of the arrangement of characters displayed on a display unit of the portable terminal can be adjusted for even users having power sight.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of inputting characters in a portable terminal, the method comprising:
   displaying on a display unit an arrangement of characters corresponding to a character input mode, from among a plurality of arrangements of characters according to various modes, where the characters according to the various modes are respectively mapped to combinations of two keys displayed on at least one touch pad; and
   when one of the combinations of two keys is touched, displaying a character corresponding to the character input mode from among the characters according to the various modes.

2. The method of claim 1, wherein the character input mode comprises at least one of a consonant mode, a vowel mode, an English mode, and a number input mode.

3. The method of claim 1, further comprising, after the displaying of the character:
   switching from the character input mode to another character input mode; and
   displaying an arrangement of characters corresponding to the switched character input mode.

4. The method of claim 1, further comprising:
   determining whether dragging is performed on at least two keys;
   switching from the character input mode to another character input mode when dragging is determined to be performed; and
   displaying an arrangement of characters corresponding to the switched character input mode.

5. The method of claim 1, further comprising:
   determining whether dragging is performed on at least two keys; and
   displaying a space character to perform spacing when dragging is determined to be performed.

6. The method of claim 1, wherein the displaying of a character corresponding to the character input mode comprises:
   comparing a length of time during which the combination of two keys are touched with a time; and
   displaying a character corresponding to the character input mode from among the characters according to the various modes when the length of time during which the combination of two keys are touched is less than the threshold time.

7. The method of claim 6, further comprising:
   switching from the character input mode to a number input mode when the length of time during which the combination of two keys are touched is equal to or greater than the threshold time; and
   displaying a number mapped to the combination of the two keys.

8. The method of claim 1, wherein the characters that are respectively mapped to the combinations of two keys comprise complete characters.

9. The method of claim 1, wherein the arrangement of the characters displayed on the display unit is allowed to be changed to a size.

10. An apparatus for inputting characters in a portable terminal, the apparatus comprising:
    at least one touch pad;
    a display unit displaying an arrangement of characters corresponding to a character input mode from among a plurality of arrangements of characters according to various modes, and displaying a character received from a character input processor, where the characters according to the various modes are respectively mapped to combinations of two keys displayed on the touch pad; and
    the character input processor checking a character corresponding to the character input mode from among the characters according to the various modes, and outputting the character to the display unit, when one of the combinations of the two keys is touched, where the characters according to the various modes are respectively mapped to the combinations of two keys.

11. The apparatus of claim 10, wherein the character input mode comprises at least one of a consonant mode, a vowel mode, an English mode, and a number input mode.

12. The apparatus of claim 10, wherein the character input processor switches from the character input mode to another character input mode after displaying the character to the display unit.

13. The apparatus of claim 10, wherein the character input processor switches from the character input mode to another character input mode when dragging is performed on at least two keys displayed on the touch pad.

14. The apparatus of claim 10, wherein the character input processor outputs a space character to perform spacing when dragging is performed on at least two keys displayed on the touch pad.

15. The apparatus of claim 10, wherein the character input processor compares a length of time during which the combination of the two keys is touched with a threshold time, and determines whether to display a character corresponding to the character input mode or switch from the character input mode to a number input mode.

16. The apparatus of claim 10, wherein the characters that are respectively mapped to the combinations of the two keys comprise complete characters.

17. The apparatus of claim 10, wherein a size of an arrangement of the characters displayed on the display unit size adjustable.

18. An apparatus for inputting characters in a portable terminal, the apparatus comprising:
    means for displaying an arrangement of characters corresponding to a character input mode, from among a plurality of arrangements of characters according to various modes, where the characters according to the various modes are respectively mapped to combinations of two keys displayed on at least one touch pad; and
    means for displaying a character corresponding to the character input mode from among the characters according to the various modes when one of the combinations of two keys is touched.

* * * * *